United States Patent [19]
Bauman et al.

[11] Patent Number: 6,119,209
[45] Date of Patent: Sep. 12, 2000

[54] BACKUP DIRECTORY FOR A WRITE CACHE

[75] Inventors: Ellen Marie Bauman; Robert Edward Galbraith; Mark A. Johnson, all of Rochester, Minn.

[73] Assignee: International Business Machines Corporation, Armonk, N.Y.

[21] Appl. No.: 09/017,830

[22] Filed: Feb. 3, 1998

[51] Int. Cl.[7] .................................................. G06F 13/00
[52] U.S. Cl. ........................... 711/162; 711/118; 711/156; 711/161
[58] Field of Search .................................. 711/162, 130, 711/129, 136, 122, 120, 112, 4, 118, 156, 161; 360/48; 714/6

[56] References Cited

U.S. PATENT DOCUMENTS

| | | | |
|---|---|---|---|
| 4,916,605 | 4/1990 | Beardsley et al. | 711/162 |
| 4,920,478 | 4/1990 | Furuya et al. | 711/136 |
| 5,337,197 | 8/1994 | Brown et al. | 360/48 |
| 5,404,500 | 4/1995 | Legvold et al. | 714/6 |
| 5,542,066 | 7/1996 | Mattson et al. | 711/136 |
| 5,636,359 | 6/1997 | Beardsley et al. | 711/122 |
| 5,748,985 | 5/1998 | Kanai | 711/130 |
| 5,771,367 | 6/1998 | Beardsley et al. | 711/162 |
| 5,774,682 | 6/1998 | Benhase et al. | 711/122 |
| 5,813,032 | 9/1998 | Bhargava et al. | 711/130 |

*Primary Examiner*—John W. Cabeca
*Assistant Examiner*—Fred F. Tzeng
*Attorney, Agent, or Firm*—Wood, Herron & Evans L.L.P.

[57] ABSTRACT

For error recovery purposes, a backup copy of only a portion of the cache directory is maintained in non-volatile storage. Because only a portion of the cache directory is backup copied, a savings in storage space is realized. The partial copy includes an indication of the storage locations on a storage device for which data is in the cache, and an indication of the state of the data, i.e., whether the data is in process of being read from the cache by the processor, is in process of being written to the cache by the processor, is in the process of being destaged from the cache to the storage device, or none of the above. Only certain changes to the state of the cache cause a backup copy of a portion of the cache directory to be saved; other changes to the state of the cache do not cause the portion of the cache directory to be saved in non-volatile storage. This saves processing time by limiting the number of times that data is copied to the cache.

18 Claims, 14 Drawing Sheets

BACKUP DIRECTORY FOR A WRITE CACHE

CROSS REFERENCE TO RELATED APPLICATION

This application is related to commonly-owned application Ser. No. 09/018,175, entitled DESTAGE OF DATA FROM A WRITE CACHE, filed concurrently herewith in the name of Ellen M. Bauman, Robert E. Galbraith and Mark A. Johnson, which is incorporated by reference herein in its entirety.

FIELD OF THE INVENTION

The invention relates to establishment of a backup copy of a cache directory, and methods for managing the use of this backup copy to improve efficiency thereof.

BACKGROUND OF THE INVENTION

In a data processing system, instructions and associated data are transferred from storage devices to one or more processors for processing, and then resulting data generated by the processor is returned to storage devices. Thus, typical processing operations involve frequent and repetitive reading and writing from/to storage devices. As a result, storage access delays are often a primary limitation in the performance of a data processing system. Preferably, therefore, storage access speed should be maximized to maximize performance. However, often cost and other constraints require that the storage devices be comprised of relatively long access time circuitry, e.g., hard disk drives. To overcome the resulting performance drawbacks, caches are typically used.

A cache typically includes a relatively small, but relatively high speed, bank of memory, that can be more rapidly accessed by the processor(s) than the storage device that the cache services. A write cache is used to temporarily store data being written by the processor to a storage device. The processor writes data into the write cache, and thereafter the data is transferred or destaged from the write cache to the appropriate storage device. A read cache duplicates memory locations in the storage device, so that when a particular storage location being accessed by the processor is duplicated in the read cache, the processor may rapidly access the read cache instead of waiting for access to the storage device.

Caches are typically organized into "lines", which are relatively long sequences of sequential storage locations. Typically, when storage locations are written into a write cache, the data written into the cache is arranged into cache lines, and then sequential locations from one or more sequential cache lines are destaged to the storage device at one time. Similarly, when memory locations are duplicated into a read cache, typically the needed memory location as well as neighboring memory locations, are brought into a line of the cache.

Typically, a cache is associated with a cache directory, which stores an indication of those memory locations currently stored in the cache. Thus, when a processor requests access to a particular memory location, the cache directory is accessed to determine whether that memory location is in the cache. If so, the requested memory location may be accessed in the cache, if appropriate. If the memory location is not in the cache, the accessed memory location may be established in the cache, if appropriate.

When a write cache is used, there is a risk that data written to the cache but not yet destaged from the cache to the storage device will be lost, and invalid data will be left in the storage device for those storage locations for which data was in the cache. Often, the cache directory and/or cache are stored in volatile memory, that is, memory that will not retain its contents if power is removed and restored. In such a case, if power is removed in an uncontrolled manner, the cache memory and/or the cache directory will be lost. Although non-volatile memory can also be used for either or both of the cache and its directory, even non-volatile memory can lose information in the case of a circuit failure. Failures in the cache directory are particularly troublesome; if the cache directory becomes invalid, there is no way to destage data in the cache to the storage device, and no way to know which data in the storage device is invalid and which is valid.

To avoid this possibility, in the past cache circuits have been designed to maintain a complete backup copy of the entire cache directory, in a non-volatile storage media. Using this approach, in the event of a cache circuitry failure, after the failure has been remedied, the backup cache directory can be referenced and used to identify that data on the storage device which is invalid.

Unfortunately, it is burdensome to maintain a backup copy of the cache directory, for several reasons. First, substantial computational resources are consumed in maintenance of the backup cache directory, which may require the use of specialized hardware just for this purpose. Furthermore, the backup cache directory consumes a sizeable amount of storage space in relatively expensive non-volatile storage circuitry.

SUMMARY OF THE INVENTION

The invention addresses these and other difficulties inherent in maintenance of a backup copy of the cache directory, by maintaining a backup copy of only a portion of the cache directory. Because only a portion of the cache directory is duplicated, a significant savings in storage space is realized. However, the maintained backup cache directory contains sufficient information to identify that data on the storage device which is invalid.

In the specific embodiment of the invention described below, the partial copy includes an indication of the storage locations on a storage device for which data is in the cache, and an indication of the state of the data, i.e., whether the data is in process of being read from the cache by the processor, is in process of being written to the cache by the processor, is in the process of being destaged from the cache to the storage device, or none of the above.

Specifically, each line in the cache is associated with an address in a particular storage device, and a state indication. The state indication may be one of Avail, meaning the line is not storing data; Idle, meaning the line is storing data which is not currently being used; WIP, meaning the line is in the process of receiving data from the processor; RIP, meaning the line is in the process of being read by the processor; and DIP, meaning the line is in the process of being destaged from the cache.

In the algorithm described below, only certain changes to the state of the cache cause a backup copy of a portion of the cache directory to be saved in non-volatile storage; other changes to the state of the cache do not cause the portion of the cache directory to be saved in non-volatile storage. This saves processing time by limiting the number of times that data is copied to the cache.

Specifically, a portion of the cache directory is saved in non-volatile storage when a write to the cache is successfully completed, or when data is purged from the cache in favor of newer data for the same storage locations on a storage device that has been stored in the cache, or when destage of data from the cache to the storage device is successfully completed.

In still another aspect, the invention features a program product configured to maintain a partial copy of a cache directory in non-volatile storage in accordance with the aspects described above, and a signal bearing media bearing the program, which may be a transmission type media or a recordable media.

These and other advantages and features, which characterize the invention, are set forth in the claims annexed hereto and forming a further part hereof. However, for a better understanding of the invention, and the advantages and objectives attained by its use, reference should be made to the Drawing, and to the accompanying descriptive matter, in which there is described embodiments of the invention.

DETAILED DESCRIPTION

Prior to discussing the operation of embodiments of the invention, a brief overview of a computer system in which the invention may be used is provided.

Figure 1:
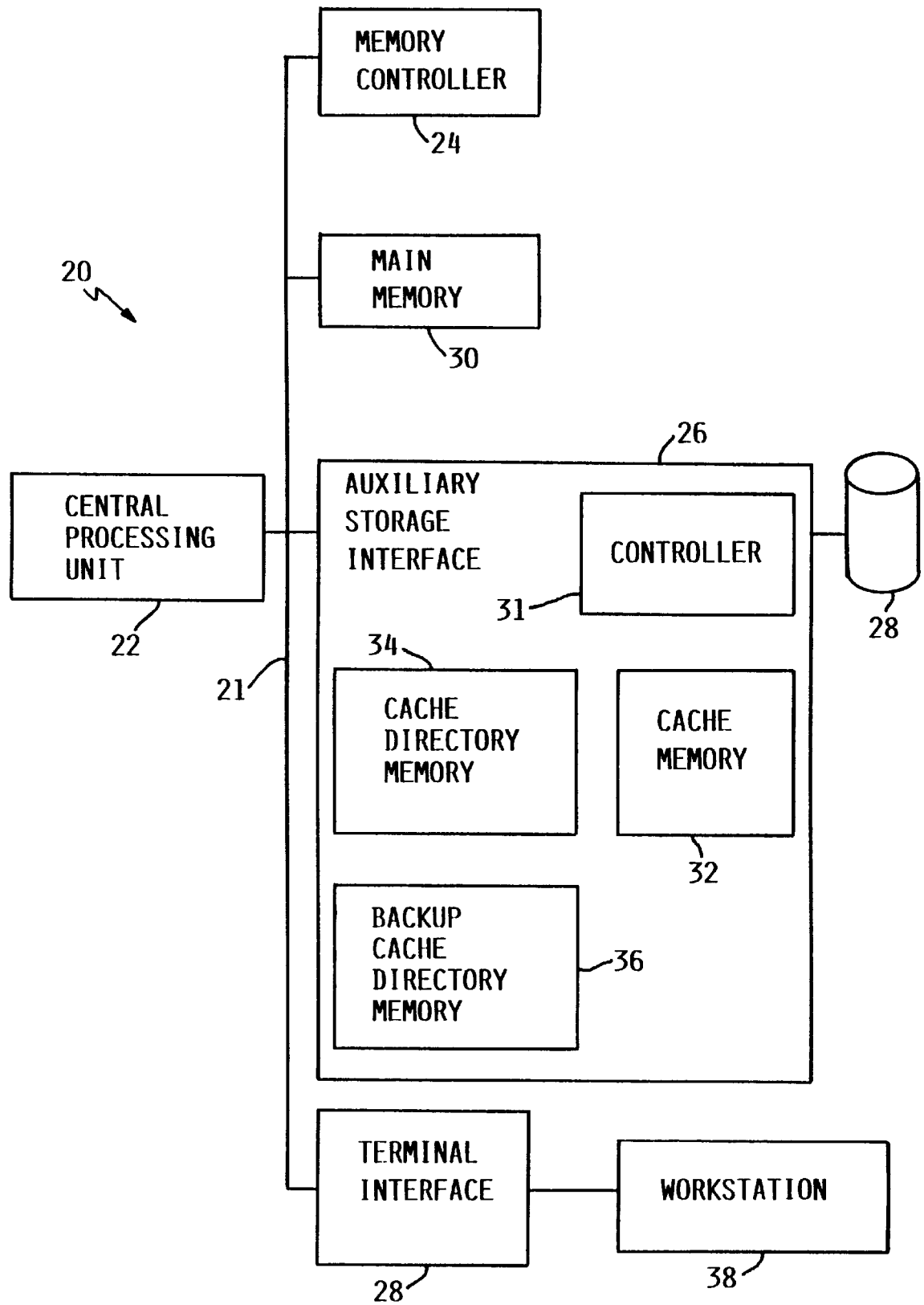
FIG. 1 is a block diagram of a computer system consistent with the invention.
Figure 2A:
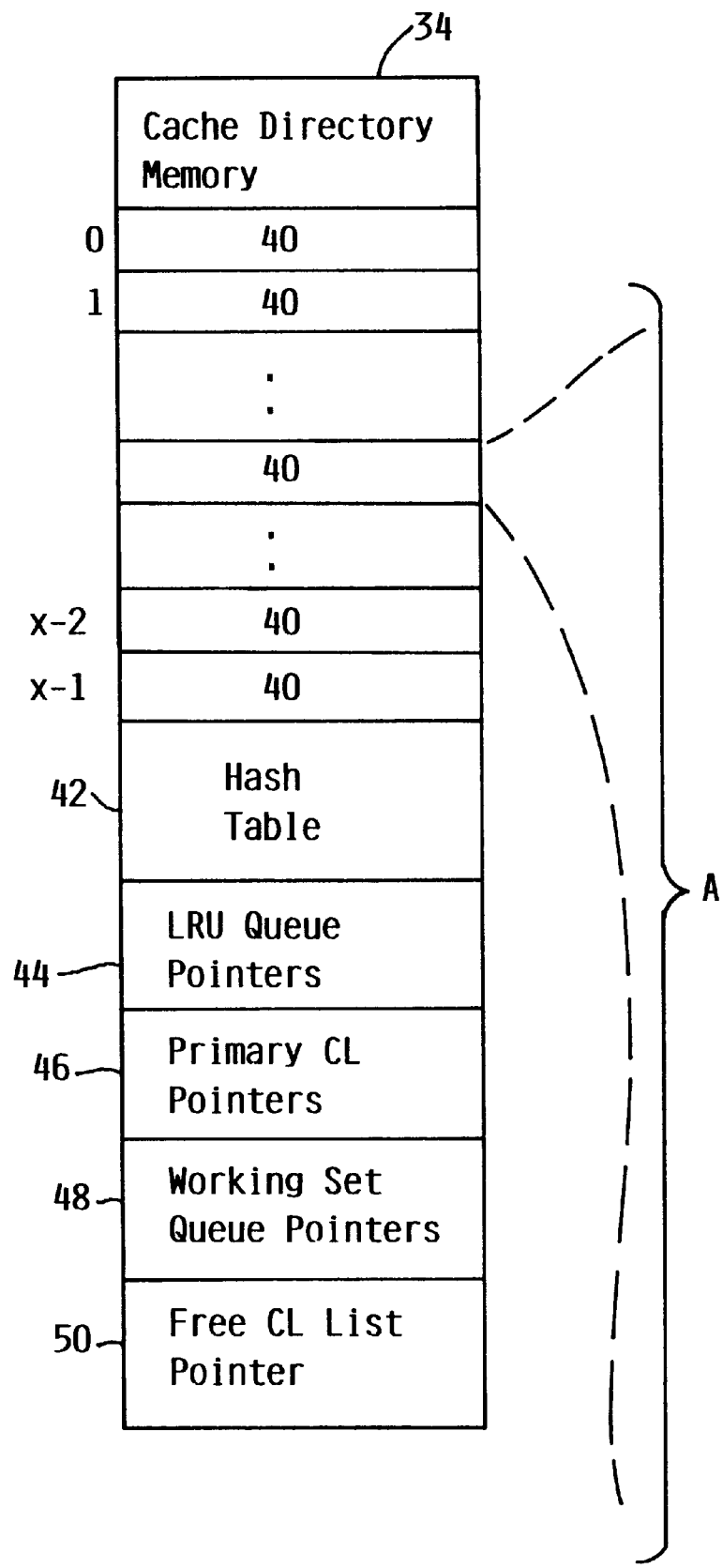
FIG. 2 is a data structure diagram showing the contents of the cache directory illustrated in FIG. 1.
Figure 2B:
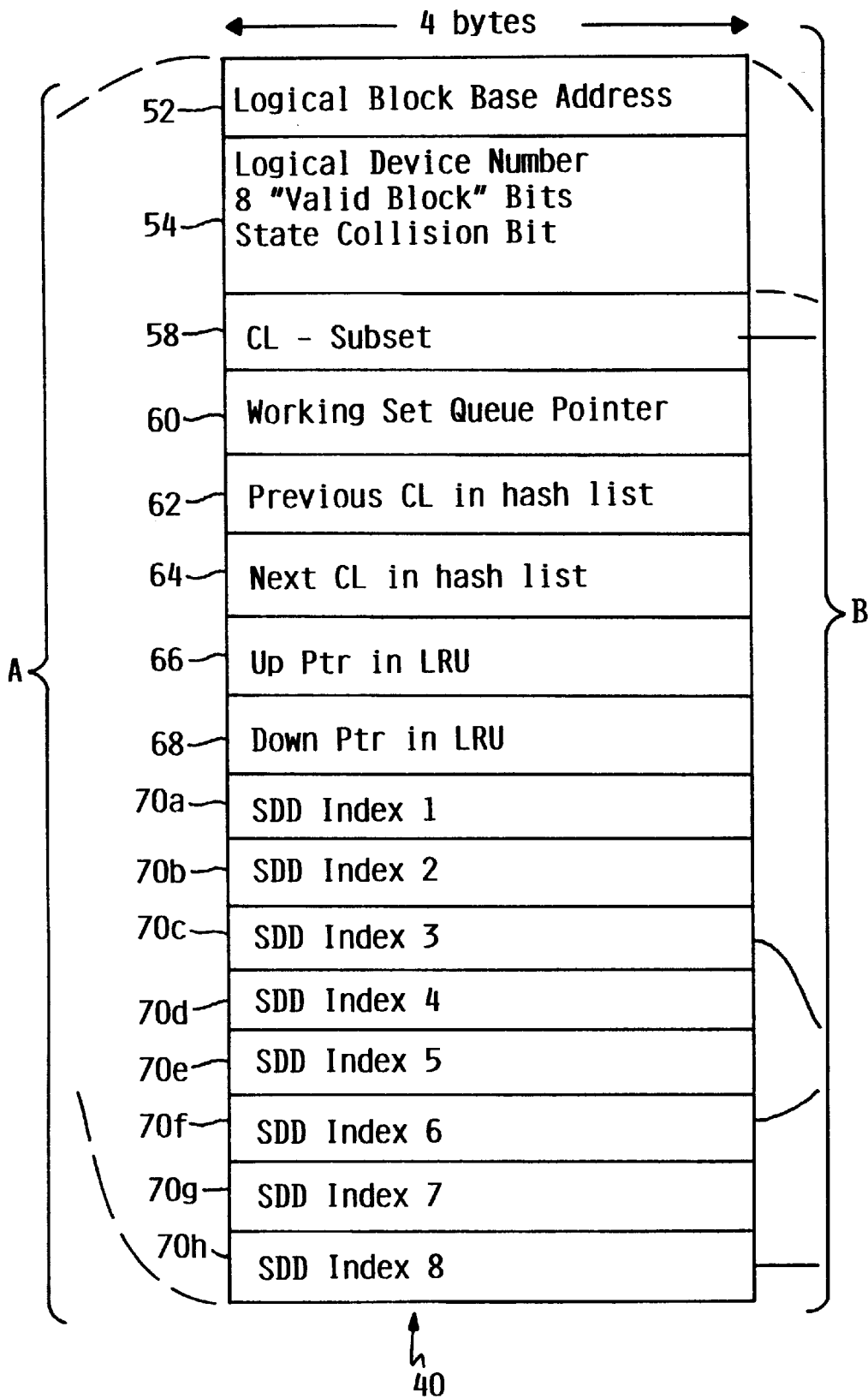
Figure 2C:
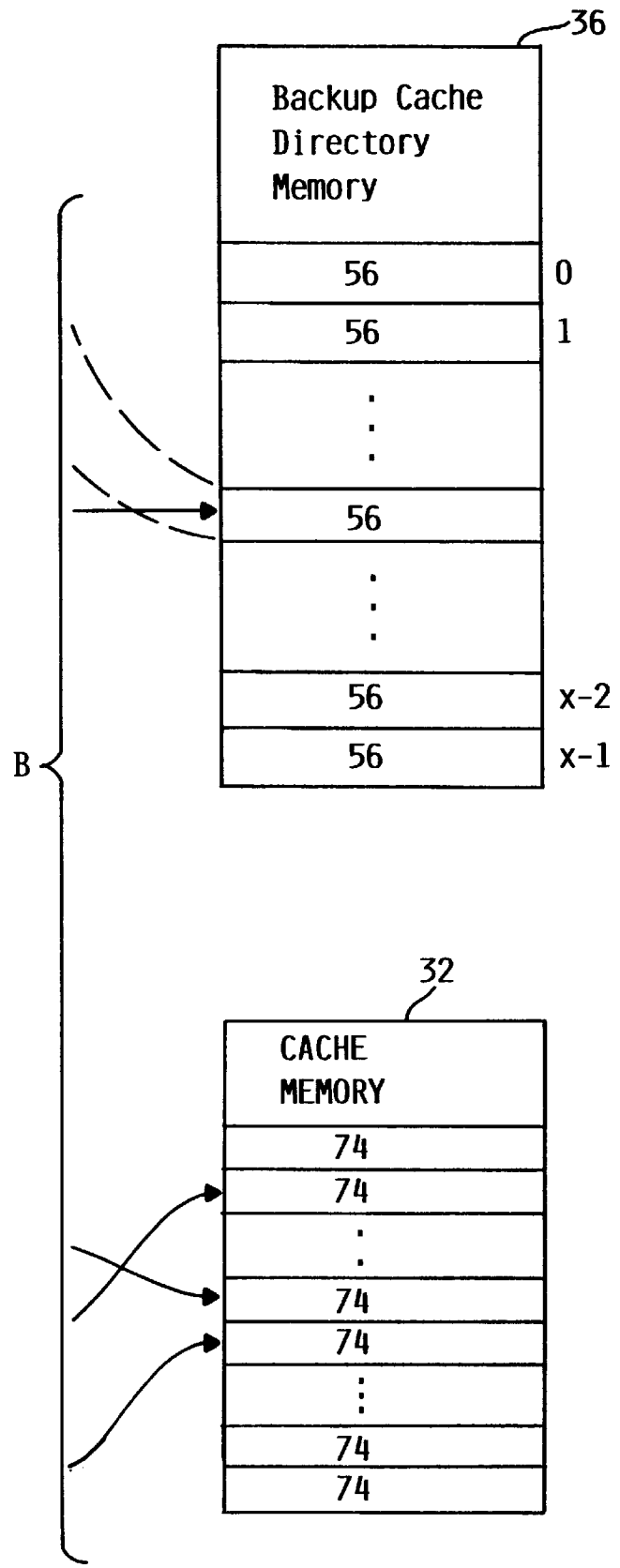

Turning to the Drawing, wherein like numbers denote like parts throughout the several views, FIG. 1 shows a block diagram of a computer system 20 consistent with the invention. Those skilled in the art will appreciate that the mechanisms and apparatus consistent with the invention apply equally to any computer system, regardless of whether the computer system is a complicated multi-user computing apparatus or a single user device such as a personal computer or workstation. As shown in FIG. 1, computer system 20 includes a main or central processing unit (CPU) 22 connected through a system bus 21 to a main memory 30, a memory controller 24, an auxiliary storage interface 26, and a terminal interface 28.

Memory controller 24, through use of a processor separate from CPU 22, moves information between main memory 30, auxiliary storage interface 26, and CPU 22. While for the purposes of explanation, memory controller 24 is shown as a separate entity, those skilled in the art understand that, in practice, portions of the function provided by memory controller 24 may actually reside in the circuitry associated with CPU 22 and main memory 30. Further, while memory controller 24 of the embodiment is described as having responsibility for moving requested information between main memory 30, auxiliary storage interface 26 and CPU 22, those skilled in the art will appreciate that the mechanisms of the present invention apply equally to any storage configuration, regardless of the number and type of the storage entities involved.

Auxiliary storage interface 26, which operates under the control of software or firmware in a controller 31, allows computer system 20 to store and retrieve information from an auxiliary storage device 28, such as a magnetic disk, magnetic tape or optical storage device. Included within auxiliary storage interface 26 is a cache memory 32 of volatile or non-volatile memory for storing lines of storage locations read from or written to the auxiliary storage device 28. Also included is a cache directory memory 34, which is a volatile or non-volatile memory storing an indication of which memory locations are within the cache memory 32, as discussed above. In addition, auxiliary storage interface 26 includes a backup cache directory memory 36, which is a self-contained non-volatile memory module, such as a battery backed SRAM. Backup cache directory memory 36 stores information regarding the memory locations stored in the cache memory 32, so that in the event of a failure in the auxiliary storage interface 26, leading to a loss of the contents of the cache memory 32 and/or cache directory memory 34, reconstruction or invalidation can be performed. Backup cache directory memory 36 is stored in one or more socketed circuits, so that when a defective auxiliary storage interface 26 is replaced, memory 36 may be moved from the defective auxiliary storage interface 26 to the replacement auxiliary storage interface without loss of the information in the backup cache directory memory.

Terminal interface 28 allows system administrators and computer programmers to communicate with computer system 20, normally through one or more programmable workstations 38.

Although the system depicted in FIG. 1 contains only a single main CPU and a single system bus, it will be understood that the invention also applies to computer systems having multiple CPUs and buses.

It will be appreciated that computer system 20 is merely an example of one system upon which the routines in accord with principles of the present invention may execute. Further, as innumerable alternative system designs may be used, principles of the present invention are not limited to any particular configuration shown herein.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, magnetic tape, etc., and transmission type media such as digital and analog communications links.

Figures 1, 6:
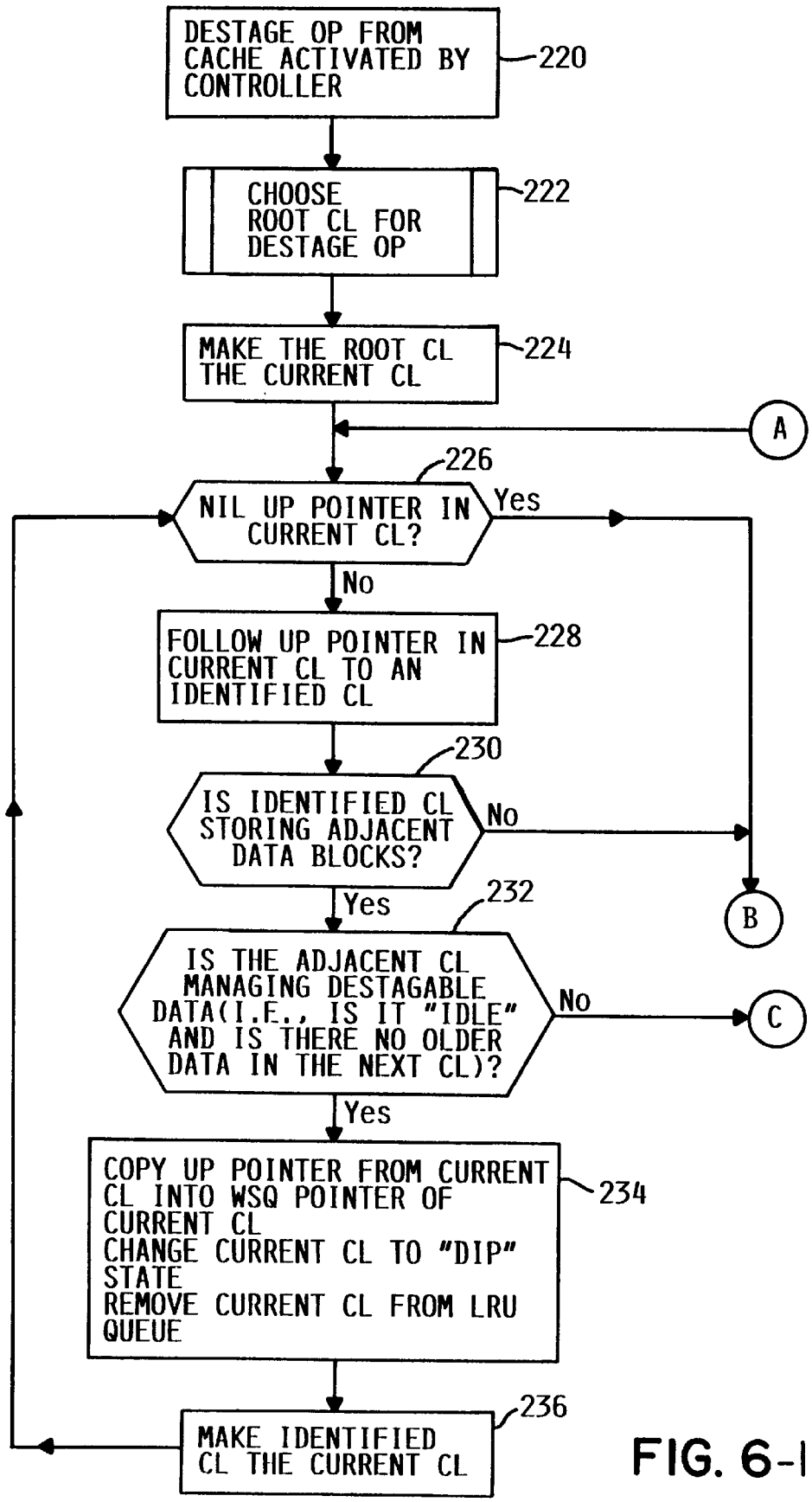
FIG. 6 is a flow chart of specific operations performed as part of selecting a working set of data for destage from the cache, and destaging data from the cache.
Figures 2, 6:
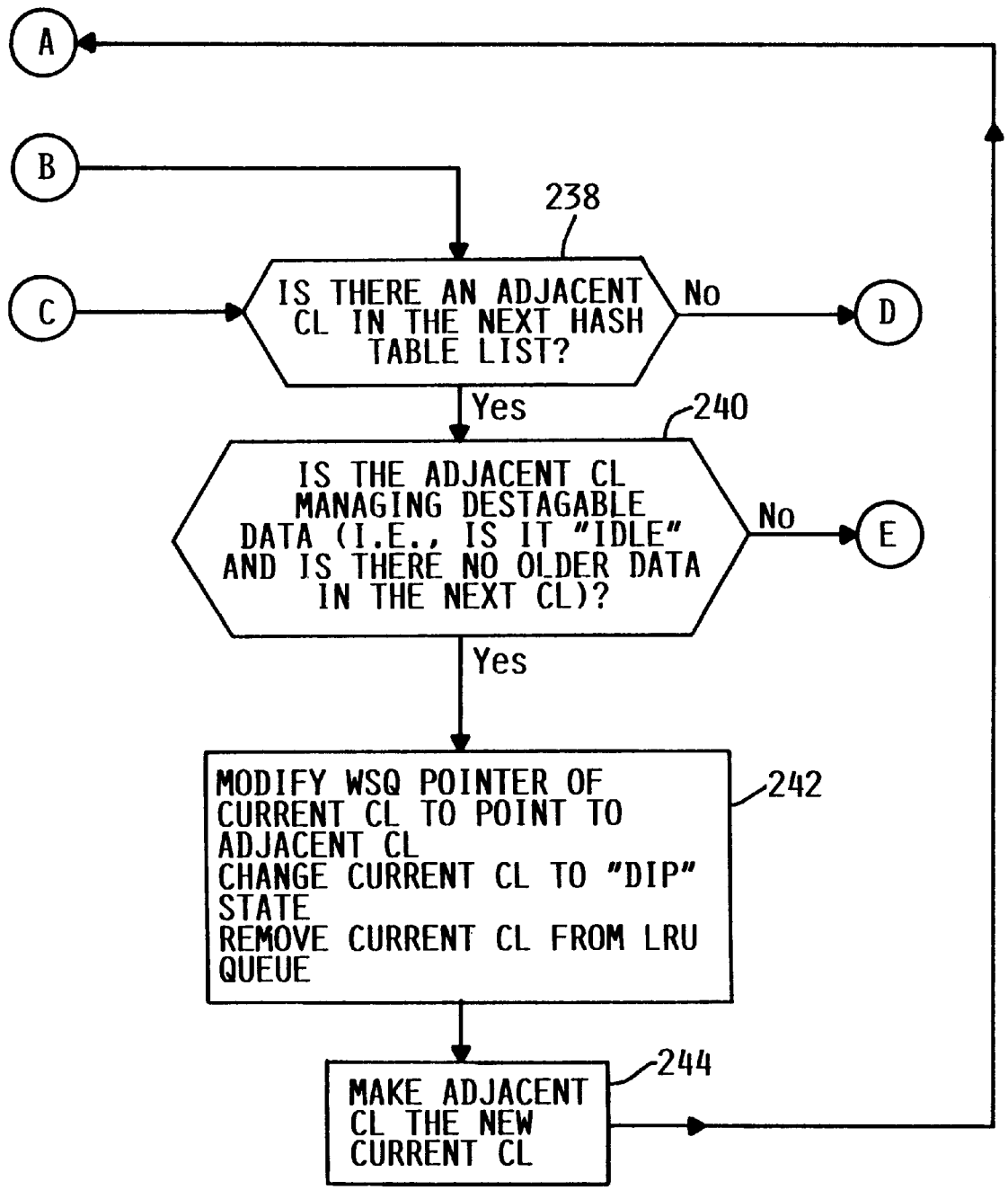
Figures 3, 6:
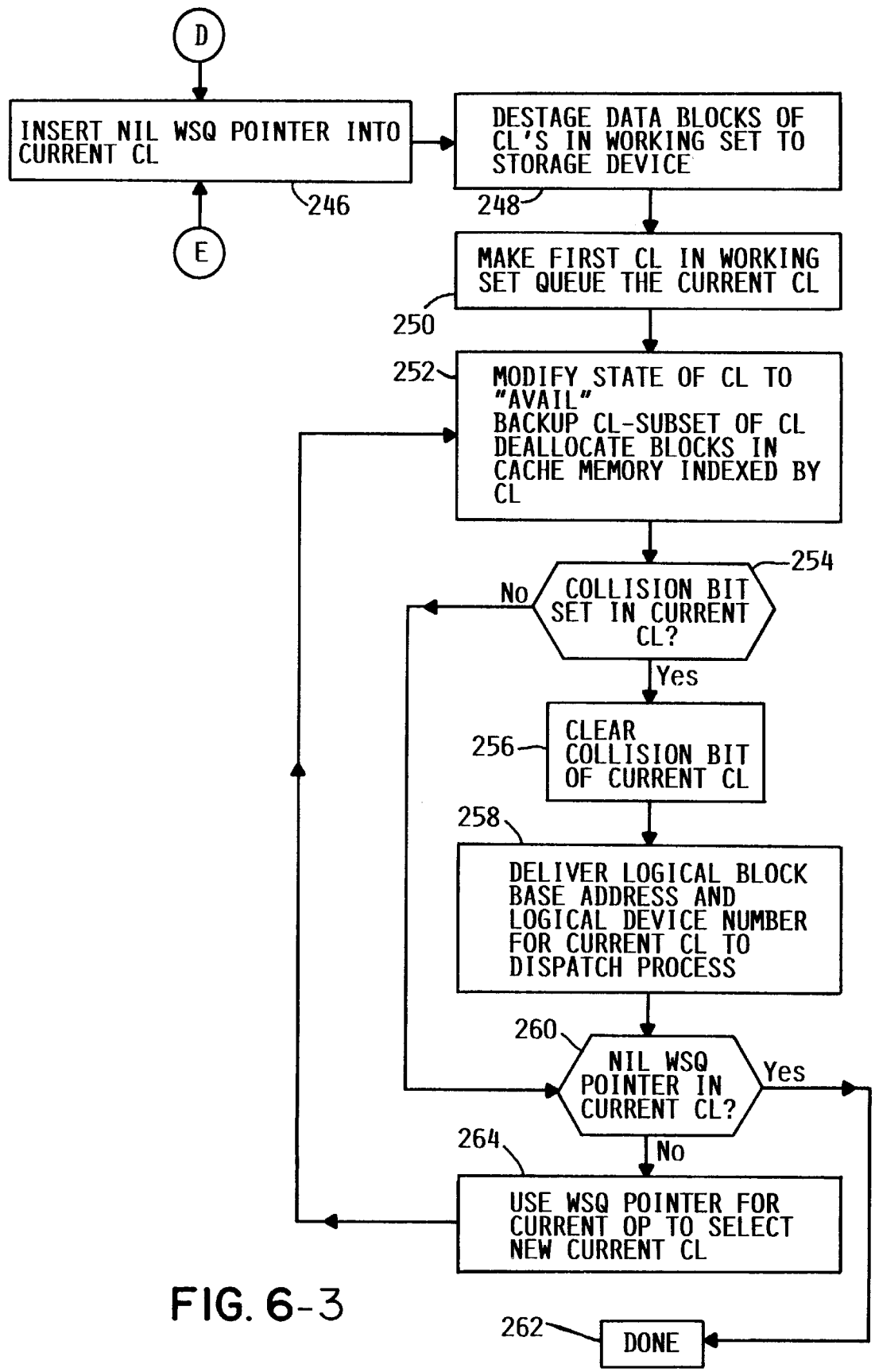

Referring now to FIG. 2, the contents of the cache directory memory 34 can be more clearly understood. Within cache directory memory 34 are a number of records 40, which for the purposes of the following disclosure will be known as cache line or CL records. Each CL record consumes 64 bytes of storage in cache directory memory 34. Each CL record, when in use, identifies the location of from one to eight contiguous blocks of data for a storage device stored in the cache. Each block stores a number of bytes of data awaiting destage from the cache to a storage device, e.g., 512, 520 or some other number of bytes. As illustrated in FIG. 2, the cache directory includes a number, x, of CL records. The size of the cache memory and the number of CL records available for managing the cache memory can be arbitrarily chosen based on performance.

In addition to the CL records, the cache directory memory 34 includes a hash table 42, used as an index to locate a CL record for a particular storage location as discussed below. Memory 34 also includes a number of pointers. Specifically, there are a plurality of LRU queue pointers 44, including one "head" and one "tail" pointer for each storage device connected to the auxiliary storage interface 26, which are used in managing queues of CL records. Furthermore, there are a plurality of priority CL pointers 46, including one pointer for each storage device connected to the auxiliary storage interface 26, which are used in identifying the first CL record of a large group of such records which is to be destaged prior to other CL records. Also, there are a plurality of working set queue pointers 48, one for each of several destage, read or write operations that may operate on the write cache, used in identifying a working set of CL records that are included in a working set for the associated operation. Finally, there is a free CL list pointer 50, used in identifying free CL records. The use of these pointers will be discussed below with reference to FIG. 3.

The detailed internal structure of a CL record is also illustrated in FIG. 2. The CL record is divided into 16 four-byte fields, each of which stores data needed for management of the cache directory. A first four-byte field 52 stores a logical block base address for the one to eight blocks of cache data being managed by the CL record. The logical block base address indicates the starting address on a storage device of the first block of the eight blocks that may be managed by the CL record. A CL record manages up to eight blocks of data, specifically, a CL record manages any or all of the eight sequential blocks of storage locations on a storage device starting at the logical block base address identified in field 42 and continuing for the following eight blocks of locations.

The second four-byte field 54 in a CL record stores additional address information for the blocks being managed by the CL record, as well as information regarding the state of those blocks in the cache. Specifically, the second four byte field stores the logical device number for the storage device in which the data blocks managed by the CL record are to be stored. Multiple logical storage devices may be managed by the auxiliary storage interface 26 illustrated in FIG. 1 using the write cache; the logical device number identified in field 54 indicates which of these storage devices that data will be stored in.

Field 54 further includes a byte of "valid block" bits, i.e., eight bits, one for each of the eight blocks managed by the CL record 40. Because a CL record may manage from one to eight blocks, it is necessary for the CL record to identify which of the eight sequential blocks following the logical block base address identified in field 52, are being managed by the CL record. The eight "valid block" bits correspond to the eight sequential blocks which follow the logical block base address. If a "valid block" bit is set, this indicates that the corresponding block in the storage device is being managed by the CL record. If a "valid block" bit is not set, this indicates that the corresponding block in the storage device is not being managed by the CL record.

Field 54 further includes state information regarding the use of the CL record. Specifically, a CL record may have one of five states:

Avail—which indicates that the CL record is not presently being used to manage data in the write cache.

WIP—which indicates that the CL record is managing data for which a write to the cache from the processor is in progress.

Idle—which indicates that the CL record is managing data in the cache, but that data is not being written, read or destaged at the present time.

RIP—which indicates that the CL record is managing data which is presently being read from the cache by the processor.

DIP—which indicates that the CL record is managing data which is presently being destaged from the cache.

As will be noted below in detail, a CL progresses through these states in a controlled manner, moving from one state to another as respective write, read, and destage operations are performed upon the CL record. As is described below, as an operation is performed on a working set of CL records, the state of each CL record that is involved in the operation, is updated to the appropriate state. Furthermore, when an operation builds a working set for an operation, the state of each CL record in the working set is evaluated, and if the state of the CL record is inconsistent with the operation to be performed, the operation is not performed on the CL record, thus preventing collisions between operations, i.e., attempts to use the same CL record and associated data for inconsistent purposes at the same time.

For example, read operations are only permitted if all of the CL records in the working set for the read operation are in the Idle state. If this is not the case, for example, if particular data is being written to the cache, and thus the associated CL record is in the WIP state, as part of identifying a working set, the read operation will detect that a CL record needed for the read operation is in the WIP state. As a result, the read operation will be suspended. A similar sequence of events will occur if any of the CL records needed for a read operation is in the process of being destaged from the cache and thus is in the DIP state. Only if all CL records included in the working set are in the Idle state, will the read operation proceed; and only in this case, will the state of all CL records be reset to the RIP state to indicate that a read is in progress for the CL record.

In the event of a collision, a flag in the CL record is set to indicate the occurrence of a collision. This flag, which is known as a collision bit, is included in field 54 of each CL record 40. When a collision is detected and an operation is suspended, the collision bit in the CL record which caused the collision is set. As discussed below, when an operation which uses a CL record terminates, that operation reviews the CL record to determine whether the collision bit is set, and if so, the previously suspended operation which experienced the collision is restarted.

The first two fields 52 and 54 of a CL record thus include complete information on the locations in the storage device of blocks being managed by the cache, and the state of those blocks in the operation of the cache. These two fields, therefore, include all information needed to identify, at any moment in time, which blocks on the storage device are storing invalid data, i.e., data which the processor has requested that the auxiliary storage interface overwrite, and for which there is new data stored in the cache waiting to be destaged to the storage device.

Fields 52 and 54 are known as a CL-subset, and are duplicated in the backup cache directory memory 36. Specifically, backup cache directory memory 36 includes the number x, of eight byte CL-subset records 56, one CL-subset record in memory 36 corresponding to each CL record 40 in cache directory memory 34.

As described below, when write, purge or destage operations are performed, the contents and state of CL records will change. When the state of a CL record transitions due to (a.) the initial writing of data into the cache, (b.) purging of data from the cache due to writing of newer data for the same storage locations, or (c.) destage of data from the cache, fields 52 and 54 (the CL-subset) of the CL record are stored into the associated CL-subset record 56 in backup cache directory memory 36. This ensures that a completely current CL-subset record is always stored in the backup cache directory memory 36. Specifically, the CL-subset record associated with a CL record is updated when the CL record transitions from the WIP state to the Idle state—in which circumstances the CL record just began managing data written to the cache which is newer than the data in the corresponding locations in the storage device. Also, the CL-subset record for a CL record is updated whenever the CL record transitions to the Avail state—in which circumstances the CL record no longer is managing data which is newer than the data in the corresponding locations in the storage device.

CL-subset records 56 and CL records 40 are allocated in pairs and permanently associated with each other. To reduce the processing burden involved in locating a CL-subset record 56 corresponding to a CL record 40, a field 58 is included in each CL record 40, for storing a pointer to the address of the CL-subset record associated with the CL record 40. Thus, to copy the CL-subset fields 52 and 54 from a CL record 40 to the associated CL-subset record 56, the CL-subset pointer 58 is retrieved from the CL record, and then this pointer is used to address a location in backup cache directory memory 36 and write the contents of fields 52 and 54 into the addressed location.

As seen in FIG. 2, each CL record further includes a field 60 for storing a working set queue (WSQ) pointer. This pointer is used as noted below when incorporating a CL record into a working set. Working sets of CL records are established as part of each read, write or destage operation performed on the cache. Working sets take the form of linked lists of CL records, with the WSQ pointer 60 in each CL record in the list identifying the next CL record in the list.

CL records further include fields 62 and 64 for storing "previous" and "next" pointers. These pointers are used as noted below to index a CL record into a doubly-linked list headed by one of the hash table entries, so that the CL record for a particular storage location can be rapidly identified from the address of that storage location.

CL records also include fields 66 and 68 for storing "up" and "down" pointers. These pointers are used as noted below to incorporate a CL record into a doubly-linked list which forms an LRU (least recently used) queue of CL records for the same logical device.

Finally, each CL record also includes eight SDD index fields 70a through 70h, which identify the location in cache memory 32 of the data for each of the eight blocks that can be managed by the CL record. Fields 70a through 70h each store an index into cache memory 32, each index identifying the location of a block of bytes in cache memory 32.

Figure 3:
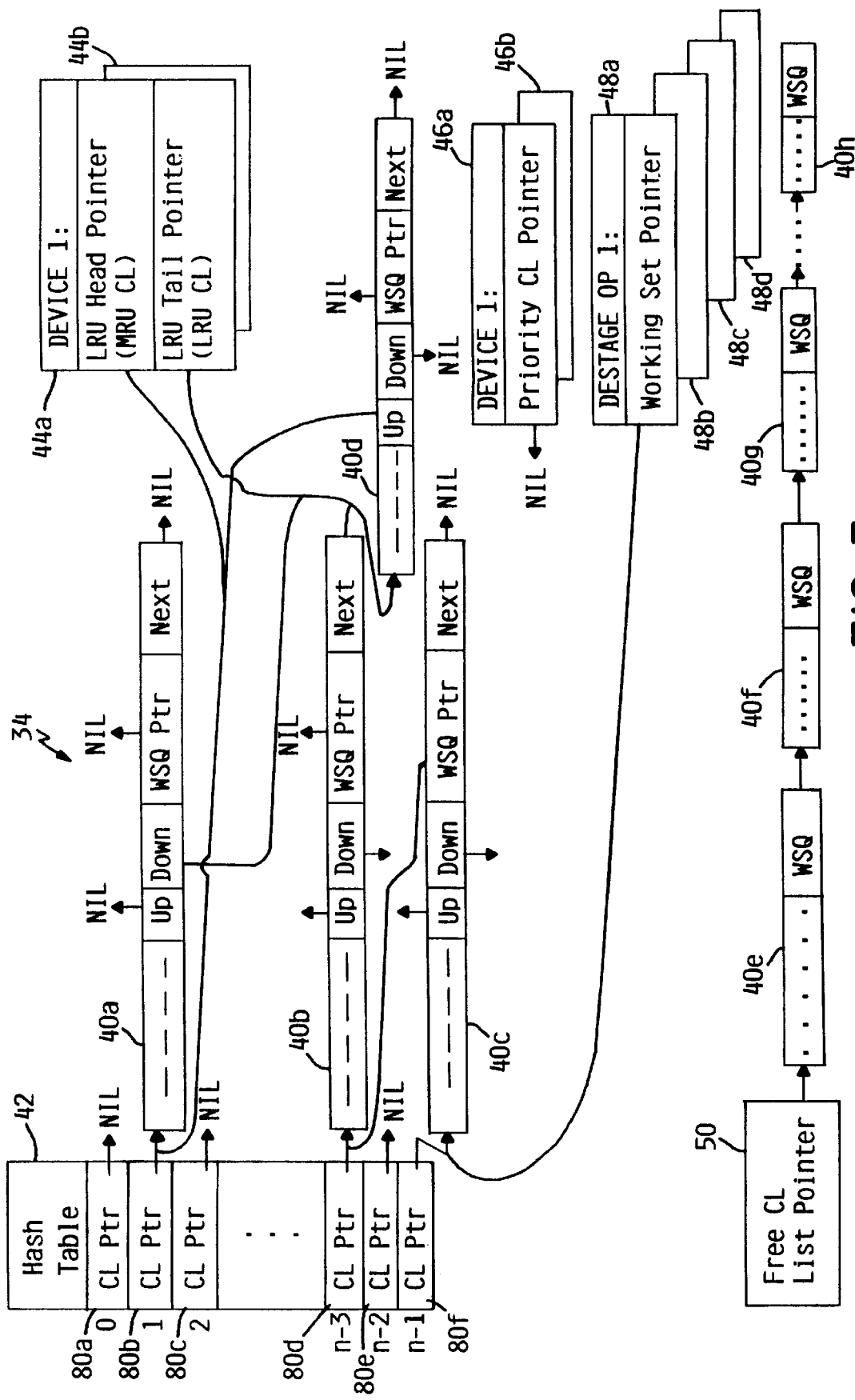
FIG. 3 is a data structure diagram showing the organization of the contents of the cache directory into lists and queues using pointers included in the data structures.

Referring now to FIG. 3, the arrangement of the CL records into lists and queues can be explained.

Initially, it will be noted that CL records which are in other than the Avail state, i.e., records which are managing data stored in the cache, are indexed into one of several doubly-linked lists which extend from the hash table 42. The hash table 42 includes a number, n, of entries 80, each of which stores a CL record pointer. There are 1024 hash table entries for each megabyte of cache memory managed by the CL records in the cache directory.

To locate a CL record, if any, which is managing cached data for a given block in a storage device, the address of the block is stripped of its three least significant bits, and the appropriate number of the remaining low order bits of the block address are used as an index into the hash table. This process will identify one of the entries 80 in the hash table. If data for the desired block is in the cache, then there will be a CL record in the doubly-linked list of CL records which that extends from the located entry 80 in the hash table. To locate the CL record, the pointer in the located entry 80 is followed to the first CL record in the list, and the logical block address and logical device number in fields 52 and 54 of this CL record are compared to the desired block address and device. If there is a match, and the valid block bit for the desired block is set, then the desired block is in the cache. If there is no match, then the next pointer in field 64 of the current CL record is followed to the next CL record in the list. This process continues until a CL record is located for the desired block, or the last CL record in the list is reached. The last CL record in the list has a NIL value next pointer in its field 64.

FIG. 3 illustrates lists of CL records, headed by entries 80b, 80d and 80f of hash table 42. Entries 80b, 80d and 80f contain pointers leading to CL records 40a, 40b and 40c, which are the respective first CL records in the lists headed by entries 80b, 80d and 80f. The other hash table entries 80a, 80c and 80e contain NIL valued pointers, indicating that there are no CL records, and no data in the cache, for block addresses which correspond to those entries.

It will be noted that lists of CL records can include one or multiple CL records. The lists headed by entries 80b and 80f of hash table 42 have single entries, namely CL records 40a and 40c, respectively. The list headed by entry 80d of hash table 42 has two entries, CL records 40b and 40d. The next pointer in field 64 of entry 40b leads to CL record 40d. The next pointer in field 64 of CL record 40d has a NIL value, indicating that CL record 40d is the last CL record in the list.

It will be noted that the lists of CL records are doubly-linked lists, that is, each CL record has a next pointer in field 64 which leads to the next CL record in the list, or has a NIL value if there is no next record, and also has a previous pointer in field 62 which leads to the previous CL record in the list. Thus, the previous pointer (not shown) in field 62 of CL record 40d leads to CL record 40b.

CL records which are in use, i.e., are in other than the Avail state, are included in the lists which extend from hash table 42. CL records which are not currently in use, i.e. are in the Avail state, are kept in a separate free list. Specifically, the free list pointer in field 50 is the head of a list of free CL records in the cache. The free list pointer in field 50 leads to a CL record 40e which is not in use. The WSQ pointer of CL record 40e points to another CL record 40f which is not in use. Further CL records 40g and 40h, each of which is in the Avail state and not currently in use, are included in the free list. As discussed below, when data is written to the cache, CL records are retrieved from the free list, initialized with appropriate pointers, and put into service. When data is destaged from the cache, the CL records for that data are added to the free list for later use.

In addition to the free list, other lists of CL records are generated as operations are performed on the cache. Specifically, a working set of CL records is established prior to each write, read or destage operation performed on the cache. As noted above, there are working set pointers 48 which head these lists. One working set, comprised of CL records 40c and 40b, is illustrated in FIG. 3. The working set pointer 48a for the operation that built this working set, points to CL record 40c. The WSQ pointer in field 60 of CL record 40c points to CL record 40b. The WSQ pointer in field 60 of CL record 40b has a NIL value, indicating that CL record 40b is the last CL record in the working set.

The cache directory memory 34 also includes LRU head and LRU tail pointers 44 for each device managed by the auxiliary storage interface 26 containing the cache. The LRU head and LRU tail pointers 44a and 44b, respectively, for a first storage device, are illustrated in FIG. 3. The LRU head pointer 44a leads to CL record 40a, which is the most recently used CL record among those CL records in the LRU queue managing data for the first storage device. The LRU tail pointer 44b leads to CL record 40d, which is the least recently used CL record among those CL records in the LRU queue managing data for the first storage device.

The CL records in the LRU queue are linked together in a doubly-linked list in order from most recently to least recently used. Thus, CL record 40a has a pointer in its down field 68 leading to the first less recently used CL record in the queue, which in the illustrated situation is CL record 40d. CL record 40a also has a pointer in its up field 66 leading to the first more recently used CL record in the queue, which in the illustrated situation has a NIL value because CL record 40a is the most recently used CL record in the queue for the first storage device. Similarly, CL record 40d has a pointer in its up field 66 leading to the first more recently used CL record in the queue, which in the illustrated situation is CL record 40a, and a pointer in its down field 68 leading to the first less recently used CL record in the queue, which in the illustrated situation has a NIL value because CL record 40d is the least recently used CL record in the queue for the first storage device.

It will be noted in FIG. 3 and in the following description, that not all CL records are in an LRU queue. Specifically, when a working set of CL records has been established for particular write or destage operation, those CL records are removed from the LRU queue for the associated storage device. Accordingly, as shown in FIG. 3, the working set of CL records identified by working set pointer 48a are not in an LRU queue, because those records will be used in a write or destage operation.

It will also be noted in the following, that multiple CL records may appear in the cache directory memory 34 for the same logical block in a given storage device. Specifically, when data is written to the cache, any prior data for the same address is not overwritten in the cache; rather, the new data is added to the cache in addition to the previous data, and then, if possible, the previously written data is purged from the cache without destaging the previously written data from the cache. As a result of this approach, at any given time there may be as many as three CL records for the same block on a given storage device in the cache directory: a CL record in the DIP state being used by a current destage operation, a CL record in the Idle state storing previously written data awaiting destage, and a CL record in the WIP state receiving new data from the processor.

A final feature of the cache directory memory 34 shown in FIG. 3, is the priority CL pointers 46, one for each storage device connected to the auxiliary storage interface 26 connected to the cache. As described below, these pointers, when not NIL, identify a CL record in the directory structure which begins an unusually large set of contiguous CL records, which set will be given priority for destage from the cache.

Referring now to FIGS. 4–7, operation and use of the cache directory structure by controller 31 during operation of a write cache can be discussed.

Figure 4A:
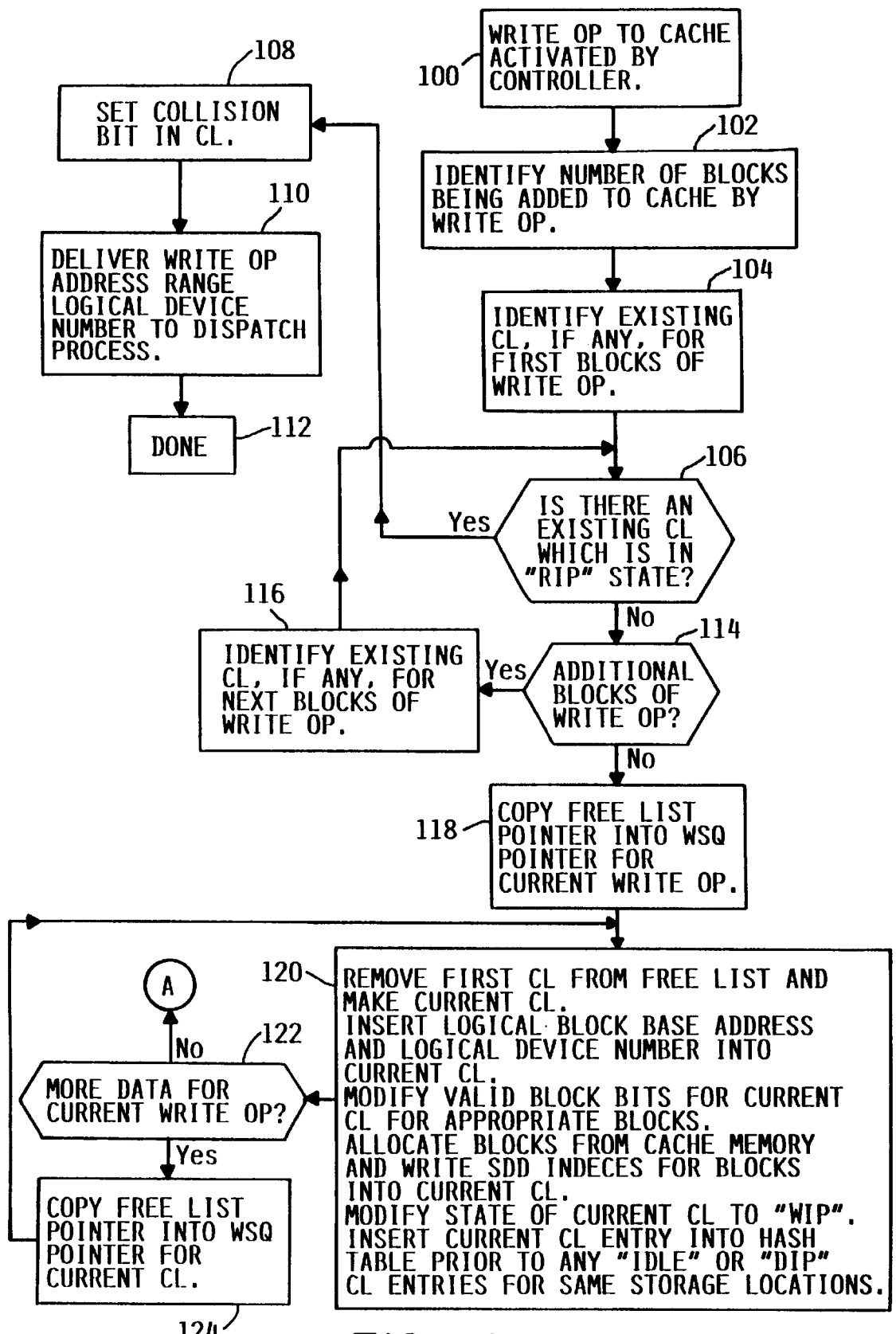
FIG. 4 is a flow chart of specific operations performed as part of selecting a working set and writing data to the cache.
Figure 4B:
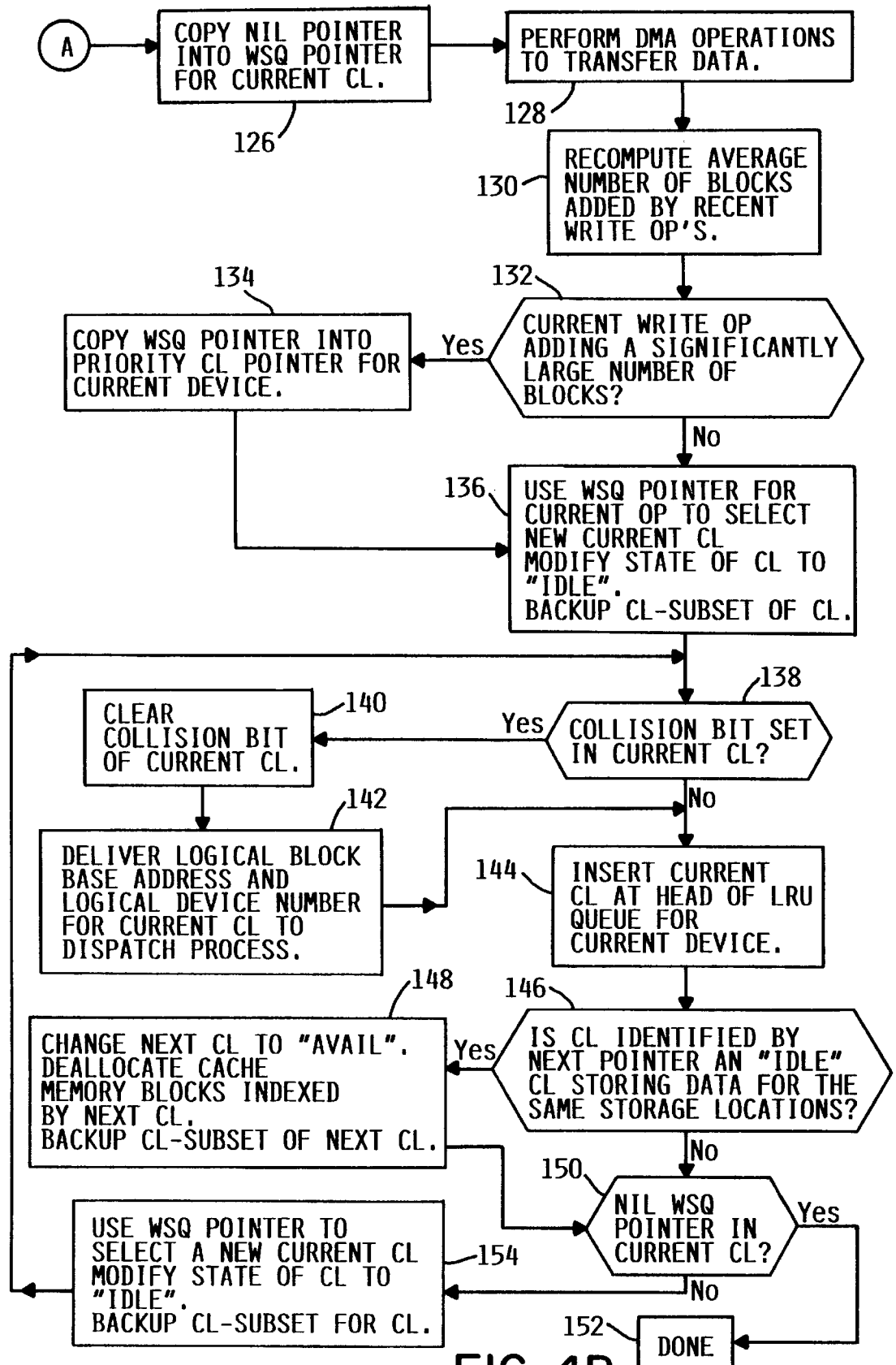

Specifically, referring to FIG. 4, when a write operation is activated by the auxiliary storage interface controller 31 (step 100), as a first step, the number of CL records that are involved in the write operation is computed (step 102). As described below, a write operation is completed by allocating cache memory blocks and CL records for data being written to the cache; in step 102, a count is made of the number of additional blocks of memory that will be consumed, to permit a later analysis of whether an exceptionally large amount of cache memory has been consumed by the write operation.

After these preliminary steps, a loop of steps is initialized, to check for collisions between the new data entering the cache and the data already present in the cache. In each iteration of this loop, the cache directory is reviewed to identify whether there is an existing CL record in the cache directory managing data for the same storage device locations as the data being written to the cache as part of the current write operation. The loop begins by identifying an existing CL record, if any, which is managing data for the same storage device locations as the first blocks of data being written to the cache by the current write operation (step 104).

During each pass through the loop, it is determined whether there is an existing CL record managing data for the same storage device location as data being written to the cache by the current write operation, and whether this existing CL record is in the read in process (RIP) state (step 106). If there is an existing CL record in the RIP state, there is a conflict between the existing data and the data being written to the cache. In this case, the conflict is resolved by stalling execution of the write operation. Specifically, in the event of a conflict, the collision bit in the existing CL record is set (step 108). Next, the address range for the write operation, and the logical number of the storage device to which the write operation is directed, are delivered to a dispatch process (step 110). This information is held in a queue, so that the dispatch process can subsequently reactivate the write operation when the collision is resolved, as described below. After stalling execution of the write operation in this manner, processing of the write operation is completed (step 112).

If, however, there is no existing CL record in the RIP state for the blocks of data analyzed in step 106, then the address range of the write operation is analyzed to determine if there are any blocks to be written that have not yet been checked for collisions (step 114). If there are additional blocks to be checked, then the loop proceeds by identifying an existing CL record, if any, which is managing data for the same storage device locations as the next blocks of data being written to the cache by the current write operation (step 116). Processing then returns to step 106, to analyze these blocks for collisions.

Once every block of a write operation have been analyzed for collisions, as determined in step 114, then a second loop of steps is performed, to allocate cache memory and CL records to add the data from the write operation to the cache. In the process of doing so, a working set of CL records is built by removing CL records from the free list (see FIG. 3) and attaching these records to the appropriate hash table lists.

To begin this process, the free list pointer 50 is copied (step 118) into the working set queue pointer 48 for the current write operation, thus making the first CL record in the free list the first CL record in the working set for the write operation. Then, the first CL record on the free list (which becomes the current CL record) is prepared for managing data for the write operation (step 120).

Specifically, the current CL record is removed from the free list by copying the working set queue pointer from the current CL record into the free list pointer 50, so that the free list pointer 50 points to the next CL record in the free list. Also, the logical block base address and the logical device number for the blocks to be managed by the current CL record are inserted into the current CL record. Further, the valid block bits in the current CL record are modified to identify which of the eight sequential blocks following the logical block base address will be managed by the current CL record. Blocks in the cache memory are then allocated for storing data for these blocks, and indeces to the allocated cache memory blocks are stored into the current CL record. The current CL record state is then modified to write in process (WIP), and finally, the current CL record is inserted into the appropriate list in the hash table 42 for the logical block base address. When the CL record is inserted into the hash table 42, it is inserted into the appropriate hash table list prior to any other CL records in the same list which are managing data for the same storage device locations. It will be noted that there may be other CL records in either the Idle or DIP states, managing data for the same storage device locations. In order to ensure that the most recent data appears first in the hash table list, when the new, WIP state CL record is added to the list, it is inserted immediately prior to any preexisting Idle state or DIP state CL records in the hash table list. This involves scanning the hash table list for any preexisting CL records managing data for the same storage device locations, and if a preexisting record is found, inserting the current CL record into the list immediately prior to the preexisting record. Furthermore, it will be noted that, because new WIP state CL records are inserted in this manner, Idle state CL records will appear in the hash table lists before DIP state CL records managing data for the same storage device locations.

After thus inserting a new CL record into the cache directory for data from a write operation, then the address range of the write operation is analyzed to determine whether there are additional blocks to be written by the write operation for which new CL records must be allocated (step 122). If so, then the free list pointer 50 is copied into the WSQ pointer 60 of the current CL record (step 124), thus making the first CL record on the free list the next CL record in the working set of CL records for the write operation. Then, processing returns to step 120 to complete the steps needed to move the first CL record on the free list from the free list to the hash table, and prepare this record for managing data for the write operation.

Once CL records have been allocated for each block of the write operation, then from step 122, processing proceeds to step 126, in which a NIL pointer is stored into the WSQ pointer of the last CL record to be added to the working set, thus identifying the end of the working set of CL records. Thereafter, in step 128, DMA operations are performed to transfer the data into the allocated blocks of the cache memory.

After the data has been transferred into the cache, steps are taken to complete the write operation. First, the average number of blocks added by recent write operations is recomputed (step 130). Then, the number of blocks added by the current write operation is compared to the recomputed average (step 132). If the current write operation added a significantly large number of blocks to the cache, then the group of CL records managing the blocks added by the write operation are given priority for destage from the cache. To determine whether to give priority, the number of blocks added by the current write operation is compared to the average number computed in step 130, and if the number of blocks added by the current write operation exceeds the average, and exceeds a predetermined threshold, e.g., 64 blocks, the current write operation is given priority, unless the average number of blocks exceeds a predetermined threshold, e.g., 64 blocks, in which case priority is not given because, in such a case, the large average number of blocks indicates that most write operations have been large, and little will be gained by giving the current write operation priority. The CL records of the current write operation are given priority by copying the working set queue pointer 48 for the current write operation into the priority CL pointer 46 for the current storage device (step 134). Doing so will cause the current group of CL records to be the first group of CL records destaged from the cache.

After step 134, or immediately after step 132 if the current write operation is not significantly large, a loop of steps is performed, to change the state of the CL records and add them to the LRU queue. To initialize this loop of steps, the WSQ pointer 48 for the write operation is followed to the first CL record in the working set, which is made the current CL record. The state of this CL record is then changed to Idle, and the CL-subset (fields 52 and 54) of this CL record is copied to the backup cache directory memory 54 at the location identified by the CL-subset pointer in field 58 of the CL record (step 136).

During each iteration of this loop, the current CL record is evaluated to determine whether the collision bit for the current CL record has been set (step 138). This can occur if a read operation was stalled due to a collision experienced with respect to the current CL record. If the collision bit for the current CL record is set, then the collision bit is cleared (step 140), and then the logical block base address and the logical number of the storage device for the current CL record are delivered to the dispatch process (step 142). The dispatch process will then use this information to scan the queue of previously stalled operations, comparing the address range of the stalled operations to the logical block base address of the current CL, to locate the operation(s) which was(were) stalled due to a collision with respect to the current CL, and restart that(those) operation(s).

After step 142, or immediately following step 138 if the collision bit in the current CL record is not set, the current CL record is inserted at the head of the LRU queue for the current storage device (step 144). This is done by copying the LRU queue head pointer for the current LRU queue into the Down pointer 68 for the current CL record, inserting NIL pointer into the Up pointer 66 for the current CL record, and inserting a pointer to the current CL record into the LRU queue head pointer for the current LRU queue.

After inserting the current CL record into the LRU queue, an evaluation is made to determine whether any previously-stored data in the cache should be purged from the cache. Specifically, if there is a preexisting CL record in the cache storing data for the same storage device locations as the current CL record, then the preexisting CL record will be the next CL record in the hash table list. Accordingly, the next pointer of the current CL record is followed to the next CL record, and the next CL record is analyzed to determine whether that CL record is in the Idle state and managing data for the same storage locations as the current CL record (step 146). If so, then the data added to the cache and being managed by the current CL record is more recent than the data being managed by the next CL record, and the data for the next CL record is purged from the cache (step 148). Specifically, the state of the next CL record is changed to Avail, and it is removed from the LRU queue and hash table list and added to the free list. Further, the blocks in cache memory indexed by the next CL record are deallocated, the CL-subset of the next CL record are copied to the backup cache directory memory 36 at the location identified by the CL-subset pointer 58 of the next CL record.

After step 148, or immediately after step 146 if the next CL record is not in the Idle state or not managing data for the same storage locations as the current CL record, it is determined whether all CL records in the working set have been processed. Specifically, it is determined whether the WSQ pointer of the current CL is NIL (step 150). If so, then the entire working set of CL records has been added to the LRU queue, and processing of the write operation is done (step 152). If not, then the WSQ pointer of the current CL is followed to select the next CL record in the working set, which is made the new current CL record. The state of this CL record is then changed to Idle, and the CL-subset (fields 52 and 54) of this CL record is copied to the backup cache directory memory 36 at the location identified by the CL-subset pointer in field 58 of the CL record (step 154).

Figure 5A:
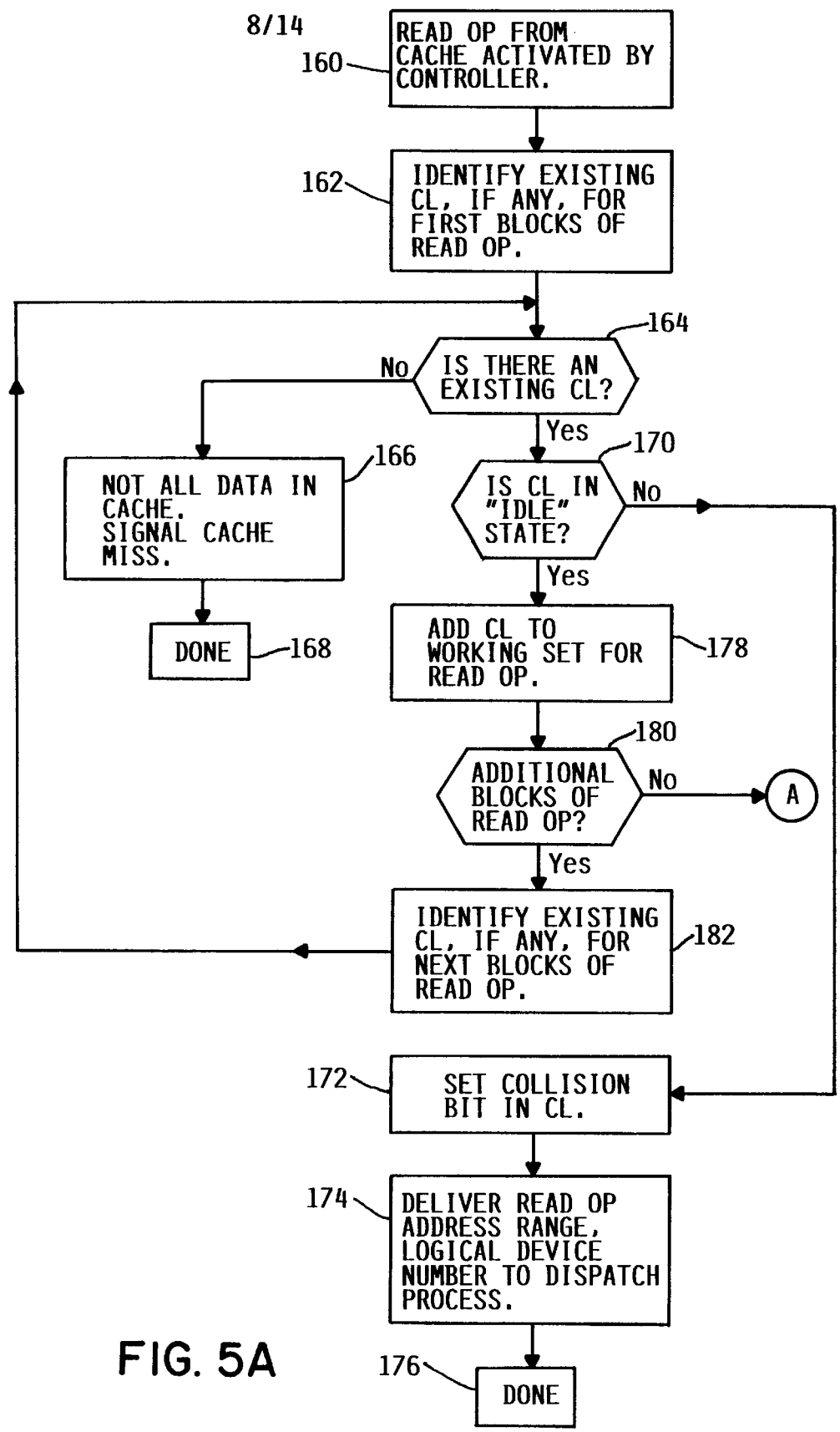
FIG. 5 is a flow chart of specific operations performed as part of reading data from the cache.
Figure 5B:
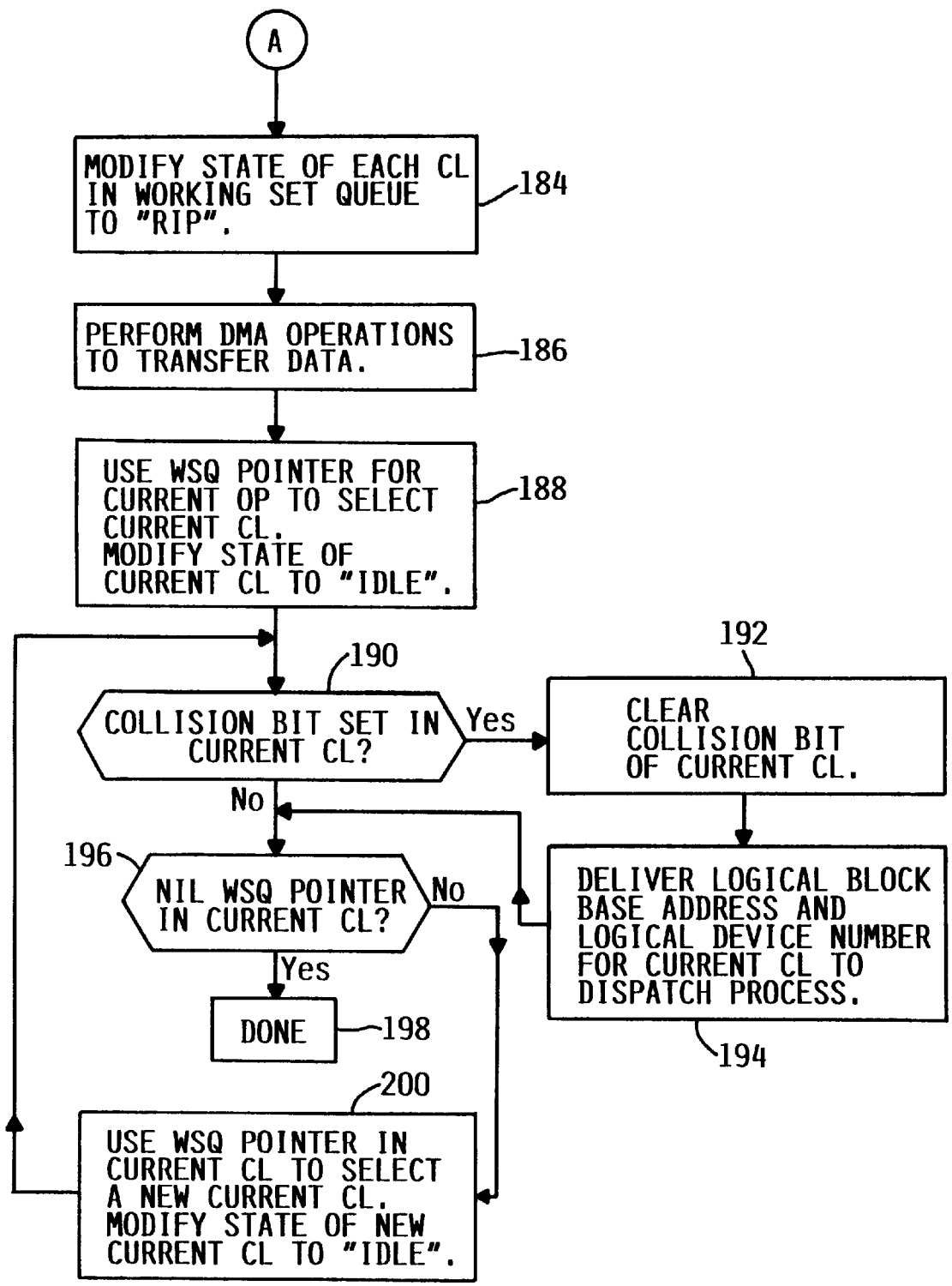

Referring now to FIG. 5, when a read operation is activated by the auxiliary storage interface controller 31 (step 160), a loop of steps is initialized, to determine whether the data sought by the read operation is present in the cache. In each iteration of this loop, the cache directory is reviewed to identify whether there is an existing CL record in the cache directory managing data for the storage device locations sought to be read by the current read operation. The loop begins by identifying an existing CL record, if any, which is managing data for the first blocks of storage device locations sought by the current read operation (step 162).

During each pass through the loop, it is determined whether there is an existing CL record managing data for data sought by the current read operation (step 164). If there is no existing CL record, then not all of the data is in the cache, and a cache miss is signalled (step 166), and processing of the read operation is done (step 168). If there is an existing Cl record, then the existing CL record is evaluated to determine whether it is in the Idle state (step 170). If there is an existing CL record but that CL record is not in the Idle state, the CL record is either in the WIP state or DIP state, and there is a conflict between the attempt to read the data managed by the record and the operation attempting to write or destage that data. In this case, the conflict is resolved by stalling execution of the read operation. Specifically, in the event of a conflict, the collision bit in the existing CL record is set (step 172). Next, the address range for the read operation, and the logical number of the storage device to which the read operation is directed, are delivered to a dispatch process (step 174). This information is held in a queue, so that the dispatch process can subsequently re-activate the read operation when the collision is resolved, as described below. After stalling execution of the read operation in this manner, processing of the read operation is completed (step 176).

If, however, there is an existing CL record in the Idle state for the blocks of data analyzed in steps 164 and 170, then the existing CL record is added to the working set for the read operation (step 178). The first CL record is added to the working set by inserting a pointer to the CL record into the working set queue pointer 48 for the read operation. Additional CL records are added to the working set by inserting a pointer to the CL record into the WSQ pointer 60 of the last CL record current in the working set. After adding a CL record to the working set, the address range of the read operation is analyzed to determine if there are any blocks sought to be read that have not yet been checked (step 180). If there are additional blocks to be checked, then the loop proceeds by identifying an existing CL record, if any, which is managing data for the next blocks of storage device locations sought to be read from the cache by the current read operation (step 182). Processing then returns to step 164, to analyze these blocks.

If and when every block sought for a read operation has been found in the cache, processing proceeds from step 180 to step 184, in which the state of each CL record in the working set is modified to read in process (RIP). This is done by following the working set queue pointers to each CL record in the working set and modifying the state of each record. Then, DMA operations are performed to transfer the sought data from the cache memory (step 186).

After desired data has been obtained from the cache in a read operation, a loop of steps is performed to reset the state of each CL record to Idle, and determine whether any collisions have occurred. This loop is initialized by using the working set queue pointer 48 for the read operation to locate the first CL record in the working set for the read operation. The state of this record is then modified to Idle (step 188).

Next, a determination is made whether the collision bit for the current CL record has been set (step 190). This can occur if a write operation was stalled due to a collision experienced with respect to the current CL record. If the collision bit for the current CL record is set, then the collision bit is cleared (step 192), and then the logical block base address and the logical number of the storage device for the current CL record are delivered to the dispatch process (step 194). The dispatch process will then use this information to scan the queue of previously stalled operations, comparing the address range of the stalled operations to the logical block base address of the current CL, to locate the operation which was stalled due to a collision with respect to the current CL, and restart that operation.

After step 194, or immediately following step 190 if the collision bit in the current CL record is not set, it is determined whether all CL records in the working set have been processed. Specifically, it is determined whether the WSQ pointer of the current CL is NIL (step 196). If so, then the entire working set of CL records has been reset to the Idle state, and processing of the read operation is done (step 198). If not, then the WSQ pointer of the current CL is followed to select the next CL record in the working set, which is made the new current CL record, and the state of this CL record is then changed to Idle (step 200). Processing then returns to step 190 to process this new current CL record.

Referring to FIG. 6, the operations performed as part of destaging data from the cache can be explained. When a destage operation is initiated by the controller (step 220), due to a lack of free space in the cache or other causes, then as a first stage of the destage operation, a root CL record is chosen (step 222). Specific details on the selection of a root CL record are provided in FIG. 6A.

After a root CL record has been chosen, the root CL record is made the current CL record (step 224), to initialize a loop of steps which selects a working set of destagable CL records substantially adjacent to the root CL record. CL records are initially selected for inclusion in the working set by reviewing sequentially more recent CL records in the LRU queue, to locate adjacent CL records that were stored along with the root CL record. This approach to locating adjacent CL records is substantially faster than reviewing the hash table lists to locate adjacent CL records, because it is not necessary to scan potentially extensive lists of CL records that appear in the hash table lists.

To scan for adjacent CL records in the LRU queue, the up pointer in the current CL record is analyzed, to determine whether the up pointer has a NIL value (step 226). If the up pointer does not have a NIL value, then the up pointer is followed to an identified CL (step 228). Then, the identified CL record is examined to determine whether it is managing data blocks which are adjacent to the data blocks of the current CL record, by comparing the logical block base address in the identified CL record to that in the current CL record (step 230).

If the identified CL record is storing adjacent data blocks, then the identified CL record is analyzed to determine whether it is managing destageable data blocks, i.e., to determine whether the identified CL is in the Idle state and whether there are any other CL records managing older data which has yet to be destaged (step 232). To determine whether there are any other CL records managing older data which has yet to be destaged, the next pointer 64 of the adjacent CL is followed to the next CL in the hash table list, and the logical block base address and logical device number of the next CL are compared to the logical block base address and logical device number of the adjacent CL. If the logical block base address and logical device number match, then the next CL is managing older data, and the data managed by the adjacent CL is not destagable.

If an adjacent, destagable CL is located, then the adjacent CL is added to the working set (step 234). Specifically, the up pointer 66 in the current CL is copied into the WSQ pointer 60 of the current CL, thus adding the adjacent CL identified by the up pointer to the working set.

As last steps of processing the current CL, the current CL is changed to the DIP state, and it is removed from the LRU queue for the current storage device (step 234). To remove the current CL from the LRU queue, the up pointer 66 in the current CL is copied into the up pointer of the CL identified by the down pointer of the current CL, or into the LRU tail pointer for the current storage device if the down pointer of the current CL is NIL. Also, the down pointer 68 of the current CL is copied into the down pointer of the CL identified by the up pointer of the current CL, or into the LRU head pointer for the current storage device if the up pointer of the current CL is NIL.

Finally, the CL identified by the up pointer 66 of the current CL, is made the new current CL (step 236), and processing returns to step 226 to process this new current CL.

If in step 226, the current CL has a NIL up pointer, or if in step 230, the CL identified by the current CL is not storing adjacent data blocks, or if in step 232, the CL identified by the current CL is not managing destageable data, then a search is performed in the hash table list, to attempt to locate a CL managing blocks adjacent to the blocks of the current CL (step 238).

If such a block is located, then the adjacent CL is evaluated to determine whether it is managing destageable data blocks, i.e., to determine whether the identified CL is in the Idle state and whether there are any other CL records managing older data which has yet to be destaged (step 240). The process for determining whether there are any other CL records managing older data which has yet to be destaged is the same as that described above with reference to step 232. If the adjacent CL is destagable, then the adjacent CL is added to the working set (step 242). Specifically, a pointer to the adjacent CL is inserted into the WSQ pointer 60 of the current CL, thus adding the adjacent CL to the working set.

As last steps of processing the current CL, the current CL is changed to the DIP state, and it is removed from the LRU queue for the current storage device (step 242). The process for removing the current CL from the LRU queue is as described above with reference to step 234.

Finally, the adjacent CL is made the new current CL (step 244), and processing returns to step 226 to process this new current CL. As a result, the adjacent CL record, and any additional CL records which can be identified using the LRU queue, will be added to the working set. Here again, a substantial savings of time and processing effort is realized by using the LRU queue to collect additional adjacent CL records into the working set, as opposed to using the hash table lists to locate adjacent CL records.

The process described above continues until, in step 238, another adjacent CL record cannot be found from the hash table entry, or until, in step 240, the adjacent CL record is not destageable. In either circumstance, processing proceeds to step 246, in which a NIL pointer is inserted into the WSQ pointer 60 of the current CL record, thus indicating the end of the working set (step 246). Next, the data blocks managed by the working set of CL records is destaged to the storage device (step 248).

After the data has been destaged, a loop of steps is performed to move the CL records in the working set to the free list and deallocate the cache memory used by those CL records. To initialize this loop of steps, the WSQ pointer 48 for the destage operation is followed to the first CL record in the working set, which is made the current CL record (step 250). The state of this CL record is then changed to Avail, and the CL-subset (fields 52 and 54) of this CL record is copied to the backup cache directory memory 36 at the location identified by the CL-subset pointer in field 58 of the CL record (step 252). In addition, the blocks of cache memory indexed by the CL are deallocated, releasing those blocks of cache memory for use by other CL records.

During each iteration of this loop, the current CL record is evaluated to determine whether the collision bit for the current CL record has been set (step 254). This can occur if a read operation was stalled due to a collision experienced with respect to the current CL record. If the collision bit for the current CL record is set, then the collision bit is cleared (step 256), and the logical block base address and the logical number of the storage device for the current CL record are delivered to the dispatch process (step 258). The dispatch process will then use this information to scan the queue of previously stalled operations, comparing the address range of the stalled operations to the logical block base address of the current CL, to locate the operation which was stalled due to a collision with respect to the current CL, and restart that operation.

After step 258, or immediately following step 254 if the collision bit in the current CL record is not set, it is determined whether all CL records in the working set have been processed. Specifically, it is determined whether the WSQ pointer of the current CL is NIL (step 260). If so, then the entire working set of CL records has been added to the LRU queue, and processing of the destage operation is done (step 262). If not, then the WSQ pointer of the current CL is followed to select the next CL record in the working set, which is made the new current CL record (step 264).

Figures 1, 6A:
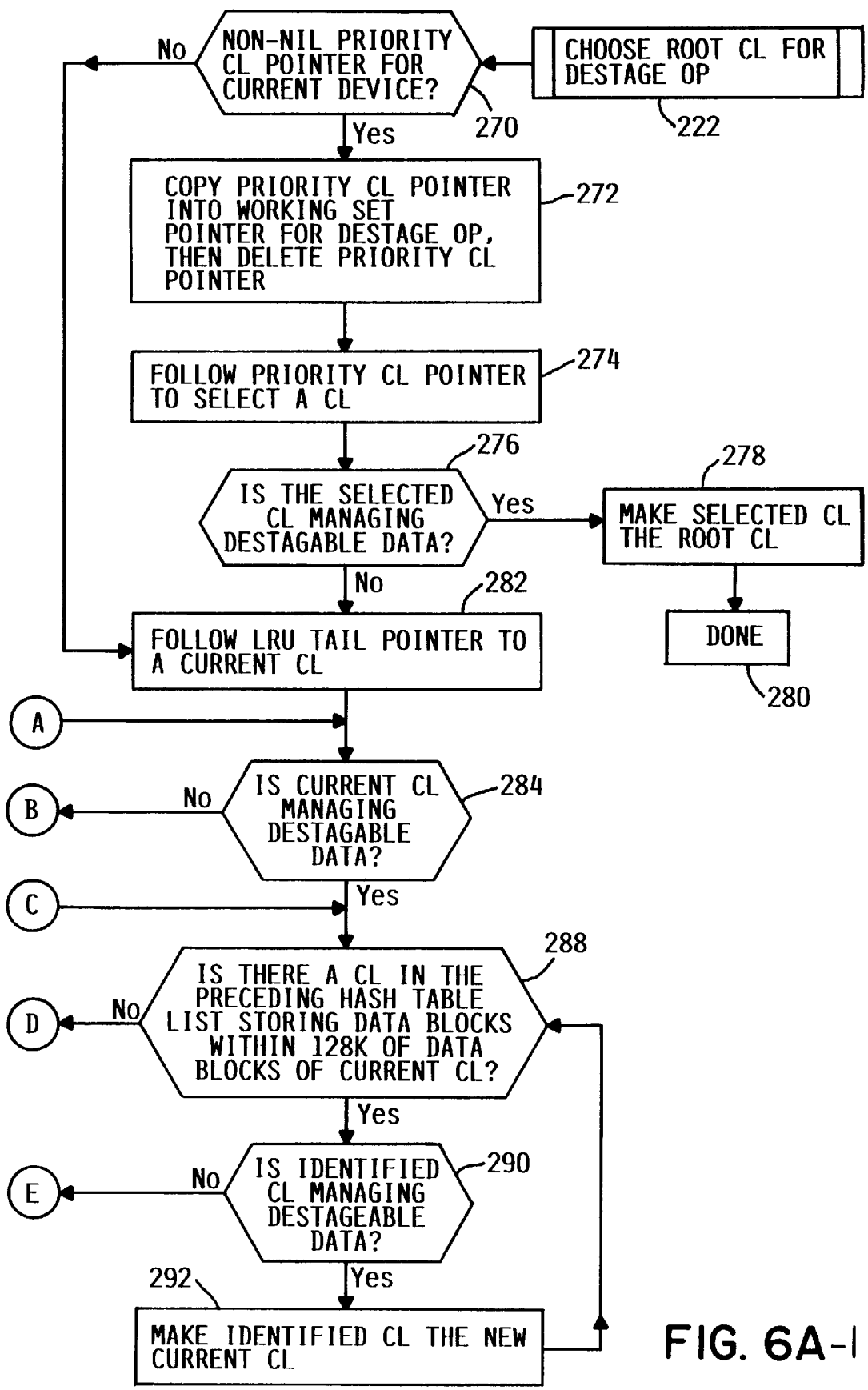
FIG. 6A is a flow chart of specific operations performed as part of selecting a root CL for building a working set of data for destage from the cache.
Figures 2, 6A:
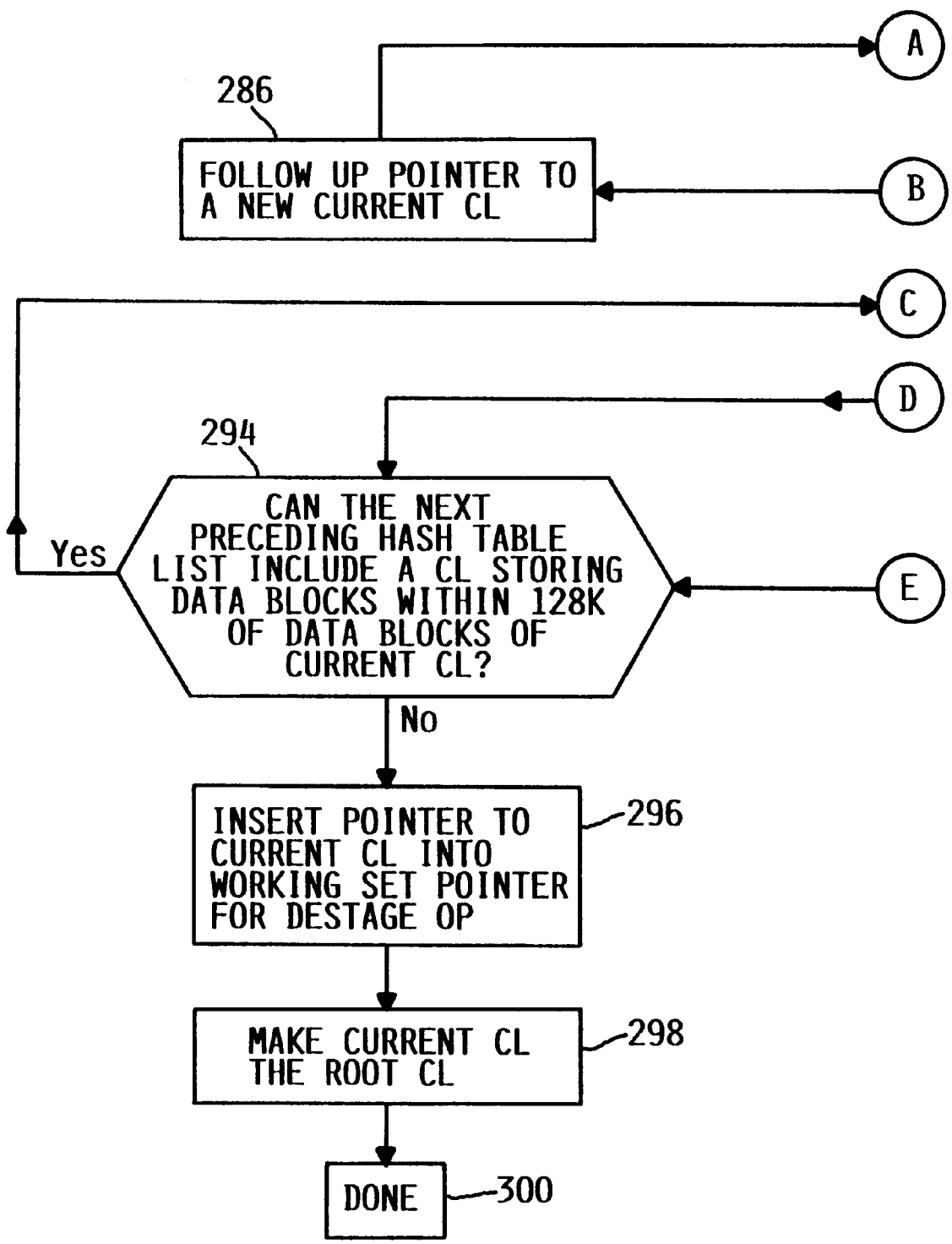

Referring now to FIG. 6A, detailed operations involved in choosing a root CL record for a destage operation can be elaborated. As discussed above, when a significantly large number of blocks is added to the cache as part of a write operation, the priority CL pointer 46 for the storage device is set to point to the first CL record managing blocks of the large group. Accordingly, when choosing a root CL record for a destage operation, the priority CL pointer for the current device is evaluated to determine whether it has a NIL value (step 270).

If the priority CL pointer 46 does not have a NIL value, then the priority CL pointer is copied into the working set queue pointer 48 for the current destage operation, thus making the CL record identified by the priority CL pointer 46 the first CL record in the working set for the destage operation, and the priority CL pointer is set to NIL (step 272). Before the destage operation can proceed, however, the CL record identified by the priority CL record must be evaluated to determine whether that CL record is destageable. Accordingly, the priority CL pointer is followed to select the CL record it identifies (step 274). Then, the selected CL record is evaluated to determine whether it is managing destageable data (step 276). The criteria for determining whether a CL record is managing destageable data in step 276, are the same as those described above with reference to steps 232 and 240. If the selected CL record is managing destageable data, then the selected CL record is made the root CL record (step 278), and the process for selecting a root CL is done (step 280).

If, however, the CL record is not managing destageable data in step 276, or if the priority CL pointer is NIL in step 270, then an alternative approach is used to select a root CL record for the destage operation. Specifically, the LRU queue is used to locate a root CL record.

Initially, the LRU tail pointer for the current storage device is followed to locate a current CL which is the least recently used CL managing data for the current storage device (step 282). This current CL is then evaluated to determine whether it is storing destageable data, using the same criteria as used in step 276 (step 284). If not, the up pointer 66 in the current CL is followed to a new current CL (step 286), and then step 284 is repeated. This process continues until the least recently used destageable CL is located.

After locating a current CL which is the least recently used destageable CL for the current storage device, processing proceeds to step 288, in which the hash table entry at the head of the list including the current CL is identified, and the CL record list extending from the preceding (lower storage device addresses) hash table entry is evaluated. The list of CL entries extending from the preceding hash table entries is evaluated to determine if it includes a CL record which is adjacent to or within a predetermined address range (e.g., 128 K storage locations) of the current CL record (step 288). If so, then the adjacent CL record is evaluated to determine whether it is managing destageable data (step 290), using the same criteria as in step 284. If the adjacent CL record is managing destageable data, the adjacent CL record is made the new current CL record (step 292), and step 288 is repeated.

If in step 288 there is no adjacent CL record in the preceding CL record list, or in step 290 the adjacent CL record in the preceding CL record list is not storing destageable data, processing proceeds to step 294, where it is determined whether the next preceding hash table list could include a CL record managing data blocks within the predetermined address range of the current CL record. If so, then step 288 is repeated to analyze the next preceding hash table list.

Steps 288, 290, 292 and 294 are repeated in this manner, walking backwards (into lower storage addresses) through the CL records in the cache, until, in step 292, a current CL record is identified for which there are no destageable CL records for the same storage device, at lower storage addresses within the predetermined address range. When such a current CL record is identified, a pointer to the current CL record is inserted into the working set pointer 48 for the current destage operation (step 296). The current CL record is made the root CL record (step 298), and the process for choosing a root CL record is done (step 300).

It will therefore be appreciated that the invention provides significant advantages in reliability of computer systems through the provision of a backup cache directory, while significantly reducing the associated storage space requirements. It will also be appreciated that numerous modifications may be made to the disclosed embodiments consistent with the invention, without departing from the spirit and scope of the invention. For example, data may be written, read or destaged from the cache in a non-contiguous manner, for example, by skipping over individual blocks or entire groups of blocks when writing, reading or destaging data. Furthermore, the cache as described above is primarily intended as a write cache, accordingly, data is not added to the cache in the event of a cache miss on a read operation; in other embodiments, the read functions of the cache could be enhanced by loading data into the cache in the event of a read miss, and by providing additional memory to store loaded data. It will be further recognized that principles of the present invention are applicable to caches used in connection with storage devices of any kind, including disk or tape drives, volatile or non-volatile memory and/or memory cards, or lower level caches. Therefore, the invention lies in the claims hereinafter appended.

What is claimed is:

1. A storage device interface, comprising
   a cache memory storing data awaiting destage to the storage device,
   a cache directory memory storing a cache directory identifying locations of data stored in the cache memory, locations in the storage device to which the data will be destaged, and the state of the data in the cache memory,
   a partial backup cache directory memory storing a copy of a portion of the cache directory including some but not all of the information in the cache directory, the partial backup cache directory memory storing at least an identification of locations in the storage device to which data in the cache memory will be destaged.

2. The storage device interface of claim 1 wherein the partial backup cache directory memory further stores an identification of the state of data in the cache memory.

3. The storage device interface of claim 2 wherein the data in the cache memory may have one or more of a write in progress, read in progress, destage in progress or idle state.

4. The storage device interface of claim 1 wherein the storage device interface manages a plurality of storage devices, and wherein each line in the cache memory is associated with a location in a particular storage device, and the partial backup cache directory memory further stores an identification of the storage device to which data in the cache memory will be destaged.

5. The storage device interface of claim 1 further comprising a controller for copying information from the cache directory memory to the partial backup cache directory memory, the controller copying an identification of locations in the storage device to which data in the cache memory will be destaged, from the cache directory to the partial backup cache directory memory.

6. The storage device interface of claim 5 wherein the controller copies the information from the cache directory memory to the partial backup cache directory memory only when new data is written into the cache or when data is destaged or otherwise purged from the cache.

7. The storage device interface of claim 1 wherein the cache directory memory comprises a non-volatile memory.

8. The storage device interface of claim 1 wherein the cache memory comprises a non-volatile memory.

9. The storage device interface of claim 1 wherein the partial backup cache directory memory comprises a non-volatile memory.

10. A method of storing a backup copy of a cache directory, the cache directory identifying locations of data stored in a cache memory, locations in a storage device to which the data will be destaged, and the state of the data in the cache memory, the method comprising the steps of:

providing a partial backup cache directory memory, storing a copy of a portion of the cache directory including some but not all of the information in the cache directory into the partial backup cache directory memory, including at least an identification of locations in the storage device to which data in the cache memory will be destaged.

11. The method of claim 10 further comprising storing an identification of the state of data in the cache memory into said partial backup cache directory memory.

12. The method of claim 11 wherein the data in the cache may have one or more of a write in progress, read in progress, destage in progress or idle state.

13. The method of claim 10 applied to a cache which manages data for a plurality of storage devices, wherein each line in the cache memory is associated with a location in a particular storage device, further comprising storing in the partial backup cache directory memory an identification of the storage device to which data in the cache memory will be destaged.

14. The method of claim 10 wherein information is copied from the cache directory memory to the partial backup cache directory memory only when new data is written into the cache or when data is destaged or otherwise purged from the cache.

15. The method of claim 10 wherein the provided partial backup cache directory memory is a non-volatile memory.

16. A program product, comprising:

(a) a program configured to store a backup copy of a cache directory, the cache directory identifying locations of data stored in a cache memory, locations in a storage device to which the data will be destaged, and the state of the data in the cache memory, by the steps of:

providing a partial backup cache directory memory, storing a copy of a portion of the cache directory including some but not all of the information in the cache directory into the partial backup cache directory memory, including at least an identification of locations in the storage device to which data in the cache memory will be destaged; and (b) a signal bearing media bearing the program.

17. The program product of claim 16, wherein the signal bearing media is a transmission type media.

18. The program product of claim 16, wherein the signal bearing media is a recordable media.

\* \* \* \* \*